(12) United States Patent
Zhou et al.

(10) Patent No.: US 8,542,783 B2
(45) Date of Patent: Sep. 24, 2013

(54) METHOD FOR UNIFYING SECONDARY SYNCHRONIZATION SIGNAL DETECTION AND FRAME TIMING SYNCHRONIZATION

(75) Inventors: Peng Zhou, Shenzhen (CN); Yuefeng Chen, Shenzhen (CN); Yijun Shi, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 13/259,491

(22) PCT Filed: Apr. 2, 2010

(86) PCT No.: PCT/CN2010/071539
§ 371 (c)(1),
(2), (4) Date: Sep. 23, 2011

(87) PCT Pub. No.: WO2010/145267
PCT Pub. Date: Dec. 23, 2010

(65) Prior Publication Data
US 2012/0093267 A1    Apr. 19, 2012

(30) Foreign Application Priority Data

Jun. 30, 2009    (CN) .......................... 2009 1 0108539

(51) Int. Cl.
*H04J 1/00*    (2006.01)
(52) U.S. Cl.
USPC ........... 375/343; 375/145; 375/146; 370/350; 370/342; 370/335
(58) Field of Classification Search
USPC ......... 375/343, 362, 143, 145, 146; 370/350, 370/328, 343, 342; 455/434, 501
See application file for complete search history.

(56) References Cited

U.S. PATENT DOCUMENTS 7,920,598 B2 * 4/2011 Luo ................................ 370/509
7,965,759 B2 * 6/2011 Luo et al. ...................... 375/146
(Continued)

FOREIGN PATENT DOCUMENTS

| CN | 101132231 A | 2/2008 |
| CN | 101102149 A | 1/2009 |
| WO | 2008052123 A1 | 5/2008 |
| WO | 2008147823 A1 | 12/2008 |

OTHER PUBLICATIONS

International Search Report for PCT/CN2010/071539, English translation attached to original, Both Completed by the Chinese Patent Office on Jun. 12, 2010, 5 Pages all together.

*Primary Examiner* — Daniel Washburn
*Assistant Examiner* — Berhanu Tadese
(74) *Attorney, Agent, or Firm* — Brooks Kushman, P.C.

(57) ABSTRACT

The present invention discloses a method for joint secondary synchronization signal detection and frame timing synchronization, including: (1) generating local secondary synchronization sequences SSC1_$n$ and SSC2_$n$ according to a sector number of a cell group; (2) converting a received time domain signal to a frequency domain signal to obtain secondary synchronization signals S1 and S2 to be detected; (3) performing inner product operation to obtain P1_$n$=P1_$n$−1+[S1,SSC1_$n$]+[S2,SSC2_$n$], and P2_$n$=P2_$n$−1+[S1, SSC2_$n$]+[S2,SSC1_$n$]; (4) selecting the maximum value P of absolute values of correlation values in the P1_$n$ and P2_$n$, and judging whether the maximum value P is greater than a preset threshold Tmax, (5) if yes, taking the index of the maximum value P as an ID number of the cell group, or else, further carrying out step (2), and then further carrying out step (3).

11 Claims, 2 Drawing Sheets

(56) References Cited

U.S. PATENT DOCUMENTS

| | | | |
|---|---|---|---|
| 7,995,458 B2* | 8/2011 | Kwak et al. | 370/208 |
| 8,149,686 B2* | 4/2012 | Kishiyama et al. | 370/208 |
| 8,228,887 B2* | 7/2012 | Aziz et al. | 370/342 |
| 8,320,360 B2* | 11/2012 | Fukuta et al. | 370/350 |
| 8,320,565 B2* | 11/2012 | Chang et al. | 380/255 |
| 8,331,331 B2* | 12/2012 | Luo | 370/503 |
| 2001/0019576 A1* | 9/2001 | Nystrom et al. | 375/136 |
| 2002/0024942 A1* | 2/2002 | Tsuneki et al. | 370/335 |
| 2002/0064146 A1* | 5/2002 | Okuyama | 370/342 |
| 2003/0193926 A1* | 10/2003 | Lindoff et al. | 370/350 |
| 2004/0156464 A1* | 8/2004 | Wu | 375/364 |
| 2006/0114942 A1* | 6/2006 | Jang | 370/503 |
| 2006/0140155 A1* | 6/2006 | Jang et al. | 370/335 |
| 2007/0133390 A1* | 6/2007 | Luo et al. | 370/208 |
| 2007/0177535 A1* | 8/2007 | Zalio | 370/328 |
| 2008/0037669 A1* | 2/2008 | Pan et al. | 375/260 |
| 2008/0043702 A1* | 2/2008 | Moon et al. | 370/342 |
| 2008/0080439 A1* | 4/2008 | Aziz et al. | 370/338 |
| 2008/0107086 A1* | 5/2008 | Fukuta et al. | 370/335 |
| 2008/0285529 A1* | 11/2008 | Kwak et al. | 370/338 |
| 2008/0291945 A1* | 11/2008 | Luo | 370/509 |
| 2008/0305788 A1* | 12/2008 | Malladi et al. | 455/428 |
| 2009/0080407 A1* | 3/2009 | Onggosanusi et al. | 370/350 |
| 2009/0116459 A1* | 5/2009 | Do | 370/336 |
| 2009/0131037 A1* | 5/2009 | Malladi et al. | 455/422.1 |
| 2009/0323629 A1* | 12/2009 | Lindoff et al. | 370/330 |
| 2010/0061306 A1* | 3/2010 | Ryu et al. | 370/328 |
| 2010/0069066 A1* | 3/2010 | Shen et al. | 455/434 |
| 2010/0291925 A1* | 11/2010 | Nagata et al. | 455/434 |
| 2011/0090995 A1* | 4/2011 | Wilhelmsson et al. | 375/343 |
| 2011/0149947 A1* | 6/2011 | Kim et al. | 370/350 |
| 2011/0243122 A1* | 10/2011 | Lindoff et al. | 370/350 |
| 2012/0069834 A1* | 3/2012 | Ancora et al. | 370/343 |
| 2012/0108278 A1* | 5/2012 | Kim et al. | 455/501 |
| 2012/0188977 A1* | 7/2012 | Cho et al. | 370/330 |

* cited by examiner (a) FDD frame structure mode (b) TDD frame structure mode

METHOD FOR UNIFYING SECONDARY SYNCHRONIZATION SIGNAL DETECTION AND FRAME TIMING SYNCHRONIZATION

CROSS-REFERENCE TO RELATED APPLICATION

This application is the U.S. national phase of PCT Appln. No. PCT/CN2010/071539 filed Apr. 2, 2010 which claims priority to Chinese application 200910108539.8 filed Jun. 30, 2009, the disclosures of which are incorporated in their entirety by reference herein.

TECHNICAL FIELD

The present invention relates to the communication technical field, and particularly, to a method for joint secondary synchronization signal detection and frame timing synchronization in a Long Term Evolution (LTE) system.

BACKGROUND OF THE RELATED ART

In order to cope with the challenge of the wideband technique and satisfy the requirements of the new services at the same time, the 3rd Generation Partnership Project (3GPP) proposes the standard work of the LTE project, namely the LTE technique, based on the Beyond 3rd Generation in mobile communication system (B3G) technique over 10 years. In the LTE, as for the air interface technique, the Orthogonal Frequency Division Multiplexing/Frequency Division Multiple Access (OFDM/FDMA) replaces the Code Division Multiple Access (CDMA) as the multiple access technique, and the Multiple-Input Multiple-Output (MIMO) technique and the adaptive technique are largely adopted to improve the system throughput and system performance.

The cell search process is a key physical process for establishing the communication link between the user terminal and the base station in the wireless cellular system, and its main object is to make the user terminal capture the time and frequency synchronization of the situated cell, and identify the identifier of this cell and basic information broadcasted in this cell at the same time. The basic steps of the cell search in the LTE system comprises: 1) users carrying out the cell search in the central frequency band of the receiving frequency band, and obtaining the timing and cell identifier information according to the synchronization channel (SCH); 2) detecting broadcast channel (BCH) information based on the timing information maintained by the SCH and the base station, thereby obtaining other configuration information of the cell; 3) users further receiving and transmitting data on the allocated frequency band according to the obtained broadcast control information. For the SCH signal, the LTE system adopts the hierarchical synchronization search mechanism, namely including the primary synchronization channel (P-SCH) and secondary synchronization channel (S-SCH). The synchronization code in the primary synchronization channel adopts 3 Zadoff-Chu (ZC) sequences in the frequency domain, and is mainly used for carrying out the identification of the inter cell group identifier or the sector number, frequency synchronization and 5 ms timing synchronization, and at the same time, the primary synchronization sequence also acts as a pilot sequence when carrying out the coherent detection on the secondary synchronization channel; and the synchronization code in the secondary synchronization channel is generated by interleaved-mapping two short binary sequences with each other, whose main function is for cell group identifier detection and frame timing synchronization.

Figure 1:
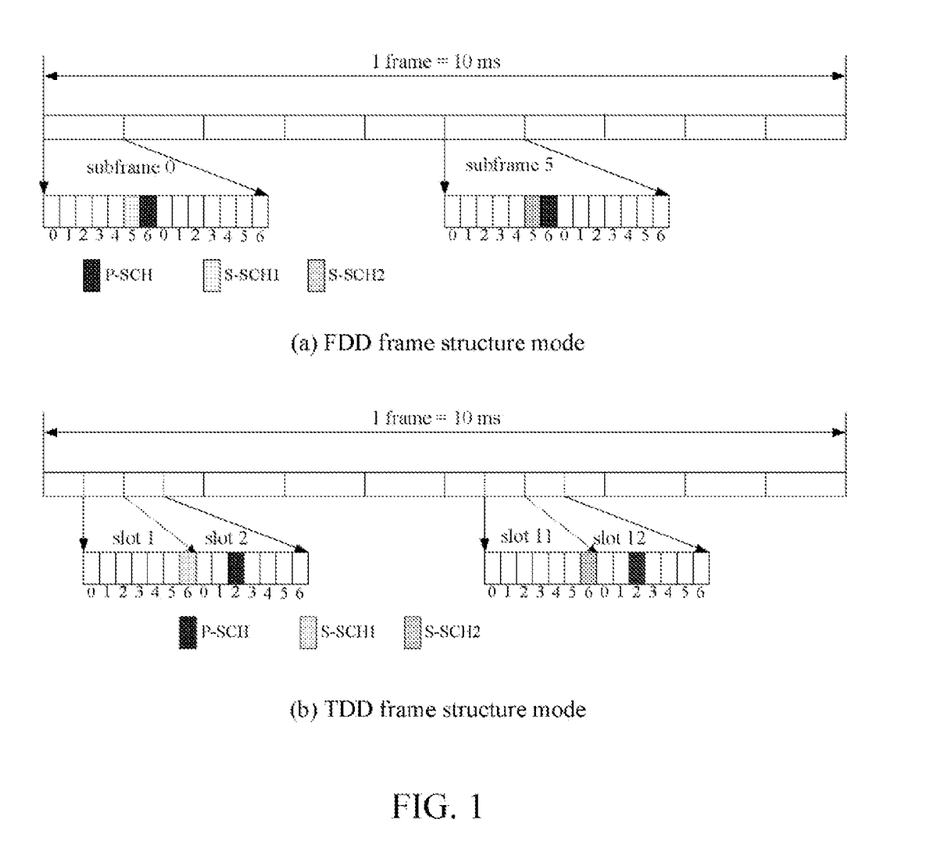
FIG. 1 is the structure schematic diagram of the primary synchronization channel and secondary synchronization channel.

With reference to FIG. 1, it is a schematic diagram of the structure of the primary synchronization channel and the secondary synchronization channel.

It can be seen from the figure that the Time-Division Multiplexing (TDM) scheme is applied in P-SCH and S-SCH, each 10 ms-radio frame is sent twice, for the P-SCH, sequences sent in successive twice are consistent so as to implement the 5 ms synchronization, and for the S-SCH, sequences sent in successive twice are different so as to implement the frame timing synchronization. For the FDD-LTE, P-SCH and S-SCH are respectively situated in the last and the last but one OFDM symbols of the $0^{th}$ and $10^{th}$ slots; and for the TDD-LTE, the P-SCH is fixedly sent in the downlink pilot time slot (DwPTS) in the specific subframe, and the S-SCH is fixedly sent on the last OFDM symbols in the $0^{th}$ and $5^{th}$ subframes.

The signal sequence of the secondary synchronization channel in the LTE system can be denoted as $d(0), \ldots, d(61)$, and this sequence is generated by interleaving two 31 bits-binary sequences each other. The generated sequence is further scrambled by one group of scrambler sequences, and this scrambler sequence is determined by the sector number $N_{ID}^{(2)}$ in the primary synchronization signal. The subframe 0 and the subframe 5 of the sequence after the cascade of two 31 bits-sequences are different, as shown in the following formula:

$$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

wherein $0 \leq n \leq 30$, $m_0$ and $m_1$ are all determined by the physical layer cell ID group $N_{ID}^{(1)}$, as shown in the following formula:

$m_0 = m' \bmod 31$ $m_1 = (m_0 + \lfloor m'/31 \rfloor + 1) \bmod 31$ $$m' = N_{ID}^{(1)} + q(q+1)/2, \quad q = \left\lfloor \frac{N_{ID}^{(1)} + q'(q'+1)/2}{30} \right\rfloor, \quad q' = \lfloor N_{ID}^{(1)}/30 \rfloor$$

the result of the above formulas is as shown in table one.

Table 1 the relationship of the physical cell group number $N_{ID}^{(1)}$ with $m_0$ and $m_1$

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |

| $N_{ID}^{(1)}$ | $m_0$ | $m_1$ |
|---|---|---|
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 1 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |

-continued

| $N_{ID}^{(1)}$ | $m_0$ | $m_1$ |
|---|---|---|
| 166 | 1 | 8 |
| 167 | 2 | 9 |
| — | — | — |
| — | — | — |

The sequences $s_0^{(m_0)}(n)$ and $s_1^{(m_1)}(n)$ are defined by the cyclic shift of the m sequence $\tilde{s}(n)$, as the following formula:

$$s_0^{(m_0)}(n)=\tilde{s}((n+m_0)\bmod 31)$$

$$s_1^{(m_1)}(n)=\tilde{s}((n+m_1)\bmod 31)$$

wherein m sequence $\tilde{s}(i)=1-2x(i)$, $0\le i\le 30$ is defined as the $x(\bar{i}+5)=x(\bar{i}+2)+x(\bar{i}))\bmod 2$, $0\le \bar{i}\le 25$ and its initial state is $x(0)=0, x(1)=0, x(2)=0, x(3)=0, x(4)=1$.

The scramble sequences $c_0(n)$ and $c_1(n)$ are determined by the inter cell group sector number detected by the P-SCH, and are composed of the two cyclic shift sequences of the m sequence $\tilde{c}(n)$:

$$c_0(n) = \tilde{c}((n + N_{ID}^{(2)})\bmod 31)$$

$$c_1(n) = \tilde{c}((n + N_{ID}^{(2)} + 3)\bmod 31)$$

wherein $N_{ID}^{(2)} \in \{0,1,2\}$ is the physical layer cell ID in the cell group number $N_{ID}^{(1)}$ namely the sector number.

The scramble sequence $\tilde{c}(i)=1-2x(i)$, $0\le i\le 30$ is defined as $x(\bar{i}+5)=(x(\bar{i}+3)+x(\bar{i}))\bmod 2$, $0\le \bar{i}\le 25$, and its initial state is $x(0)=0, x(1)=0, x(2)=0, x(3)=0, x(4)=1$.

The scramble sequences $z_1^{(m_0)}(n)$ and $z_1^{(m_1)}(n)$ are composed of the cyclic shift sequence of the m sequence $\tilde{z}(n)$, as the following formula:

$$z_1^{(m_0)}(n)=\tilde{z}((n+(m_0 \bmod 8))\bmod 31)$$

$$z_1^{(m_1)}(n)=\tilde{z}((n+(m_1 \bmod 8))\bmod 31)$$

wherein $m_0$ and $m_1$ are shown in the table one, which are determined by the cell group number $N_{ID}^{(1)}$. The scramble sequence $\tilde{z}(i)=1-2x(i)$, $0\le i\le 30$ is defined as $x(\bar{i}+5)=(x(\bar{i}+4)+x(\bar{i}+2)+x(\bar{i}+1)+x(\bar{i}))\bmod 2$, $0\le \bar{i}\le 25$, and its initial state is $x(0)=0, x(1)=0, x(2)=0, x(3)=0, x(4)=1$.

The secondary synchronization channel detection and frame timing synchronization scheme in the prior art is to carry out the cross correlation on the detection data on the secondary synchronization channel and the local 168×2 binary local sequence in the frequency domain according to the result of the primary synchronization channel detection, and judge out the corresponding secondary synchronization sequence or the secondary synchronization signal according the correlation peak; and then further obtain the frame timing synchronization according to the corresponding positions of the detection data on the secondary synchronization channel and the local 168×2 binary local sequence. It will take one radio frame as an example, detecting two successive secondary synchronization signals needs 2×62×168×2 times of multiplying operations and 2×62×168×2 times of addition operations, and thus its operation complexity is high; besides, in the case of the low signal to noise ratio, the mismatch of the detected physical cell group numbers corresponding to the two secondary synchronization signals possibly occurs, and thus the average of the radio frames has to be carried out a plurality of times to improve its correct detection probability, and therefore the operation complexity of the detection algorithm is further increased.

SUMMARY OF THE INVENTION

Regarding to the technical problems such as the high operation complexity and long cell search time during the cell search process of the existing user terminal, the present invention proposes a method for joint secondary synchronization signal detection and frame timing synchronization for solving these problems.

In order to solve the above technical problem, the present invention provides a method for joint secondary synchronization signal detection and frame timing synchronization, comprises following steps:

(1) generating local secondary synchronization sequences SSC1_$n$ and SSC2_$n$ according to a sector number of a cell group, wherein n is an index of multiple frame average, and at this time n=0;

(2) converting a received time domain signal to a frequency domain signal to obtain secondary synchronization signals S1 and S2 to be detected;

(3) carrying out inner product on said S1 and S2 with SSC1_$n$ and SSC2_$n$ respectively, then combining an inner product result to obtain sets [S1,SSC1_$n$]+[S2,SSC2_$n$] and [S1,SSC2_$n$]+[S2,SSC1_$n$], and making P1_$n$=P1_$n$−1+[S1,SSC1_$n$]+[S2,SSC2_$n$], P2_$n$=P2_$n$−1+[S1,SSC2_$n$]+[S2,SSC1_$n$], wherein P1_−1 and P2_−1 are empty sets;

(4) selecting a maximum value P of absolute values of correlation values in the P1_$n$ and P2_$n$, and judging whether the maximum value P is greater than a preset threshold Tmax, (5) if yes, taking the index of the maximum value P as an ID number of a cell group, and completing one frame timing synchronization by judging whether the maximum value occurs in P1_$n$ or P2_$n$; if not, comparing the absolute values of the correlation values in the P1_$n$ and P2_$n$ with a threshold Tccv, selecting a secondary synchronization sequence corresponding to the correlation value of which the absolute value is not less than the Tccv in the P1_$n$ and P2_$n$ as new secondary synchronization sequences SSC1_$n$ and SSC2_$n$, and the index is increased by 1, and then carrying out a step of the multiple frame average, namely carrying out step (2), and then carrying out step (3).

In the above method, said step (3) further comprises:

comparing the absolute values of the correlation values with the same cell group number in the P1_$n$ and P2_$n$ with the preset threshold Tccv, and if the absolute value of the correlation value corresponding to the same cell group number in the P1_$n$ and P2_$n$ is less than the Tccv, then discarding this cell group number.

In the above method, a value of said Tccv is normalized to 30.

In the above method, before said step (1), said method further comprises:

carrying out cross correlation on the received time domain signal and a local primary synchronization sequence, and obtaining said sector number of said cell group by detecting a correlation peak.

In the above method, said step (2) comprises:

for a received time domain signal frame, taking use of a half frame timing synchronization result and blind detection to obtain a cyclic prefix mode, and at this time, demodulating said time domain signal by orthogonal frequency division multiplex (OFDM) to frequency domain to obtain said secondary synchronization signals S1 and S2 to be detected.

In the above method, before said step (1), said method further comprises:

carrying out cross correlation on the received time domain signal and a local primary synchronization sequence, and obtaining said half frame timing synchronization result by detecting a correlation peak.

The present invention further provides an apparatus for joint secondary synchronization signal detection and frame timing synchronization, comprises:

a local secondary synchronization sequence generation module, which is configure to: generate local secondary synchronization sequences SSC1_$n$ and SSC2_$n$ according to a sector number of a cell group, and send the local secondary synchronization sequences SSC1_$n$ and SSC2_$n$ to a multiple frame average module, wherein n is an index of the multiple frame average, and n=0;

the multiple frame average module, which is configured to: convert a received time domain signal to a frequency domain signal to obtain secondary synchronization signals S1 and S2 to be detected; carry out inner product on said S1 and S2 with SSC1_$n$ and SSC2_$n$ respectively, then combine an inner product result to obtain sets [S1,SSC1_$n$]+[S2,SSC2_$n$] and [S1,SSC2_$n$]+[S2,SSC1_$n$], make P1_$n$=P1_$n$−1+[S1,SSC1_$n$]+[S2,SSC2_$n$], P2_$n$=P2_$n$−1+[S1,SSC2_$n$]+[S2,SSC1_$n$], and send the P1_$n$ and P2_$n$ to a frame timing synchronization module, wherein P1_−1 and P2_−1 are empty sets;

the frame timing synchronization module, which is configured to: select a maximum value P of absolute values of correlation values in the P1_$n$ and P2_$n$, and judge whether the maximum value P is greater than a preset threshold Tmax, and if yes, take the index of the maximum value P as an ID number of a cell group, and complete one frame timing synchronization by judging whether the maximum value occurs in P1_$n$ or P2_$n$; if not, compare the absolute values of the correlation values in the P1_$n$ and P2_$n$ with a threshold Tccv, select a secondary synchronization sequence corresponding to the correlation value of which the absolute value is not less than the Tccv in the P1_$n$ and P2_$n$ as new secondary synchronization sequences SSC1_$n$ and SSC2_$n$, increase the index by 1, and then send them to the multiple frame average module.

In the above apparatus, said multiple frame average module is further configured to:

compare the absolute values of the correlation values with the same cell group number in the P1_$n$ and P2_$n$ with the threshold Tccv, and if the absolute value of the correlation value corresponding to the same cell group number in the P1_$n$ and P2_$n$ is less than the Tccv, then discarding this cell group number.

In the above apparatus, said local secondary synchronization sequence generation module is further configured to: carry out cross correlation on the received time domain signal and a local primary synchronization sequence, and obtain said sector number of said cell group by detecting a correlation peak.

In the above apparatus, said multiple frame average module is further configured to: for a received time domain signal frame, take use of a half frame timing synchronization result and blind detection to obtain a cyclic prefix mode, and at this time, demodulate said time domain signal by orthogonal frequency division multiplex (OFDM) to frequency domain to obtain said secondary synchronization signals S1 and S2 to be detected.

In the above apparatus, said local secondary synchronization sequence generation module is further configured to: carry out cross correlation on the received time domain signal and a local primary synchronization sequence, and obtain said half frame timing synchronization result by detecting a correlation peak.

Comparing with the prior art, applying the method for joint secondary synchronization signal detection and frame timing synchronization of the present invention not only reduces the operation complexity, but also effectively improves the system performance of the secondary synchronization signal detection and frame timing synchronization based on reducing the operation complexity. Besides, it can ensure to further reduce the initial cell search time based on a certain correct detection probability by presetting a threshold Tmax. The present invention is also suitable for the cell initial search in LTE system of two types of the duplex structure, FDD and TDD.

PREFERRED EMBODIMENTS OF THE PRESENT INVENTION

Below it will describe the method for joint secondary synchronization signal detection and frame timing synchronization of the present invention with reference to the accompanying figures.

Figure 2:
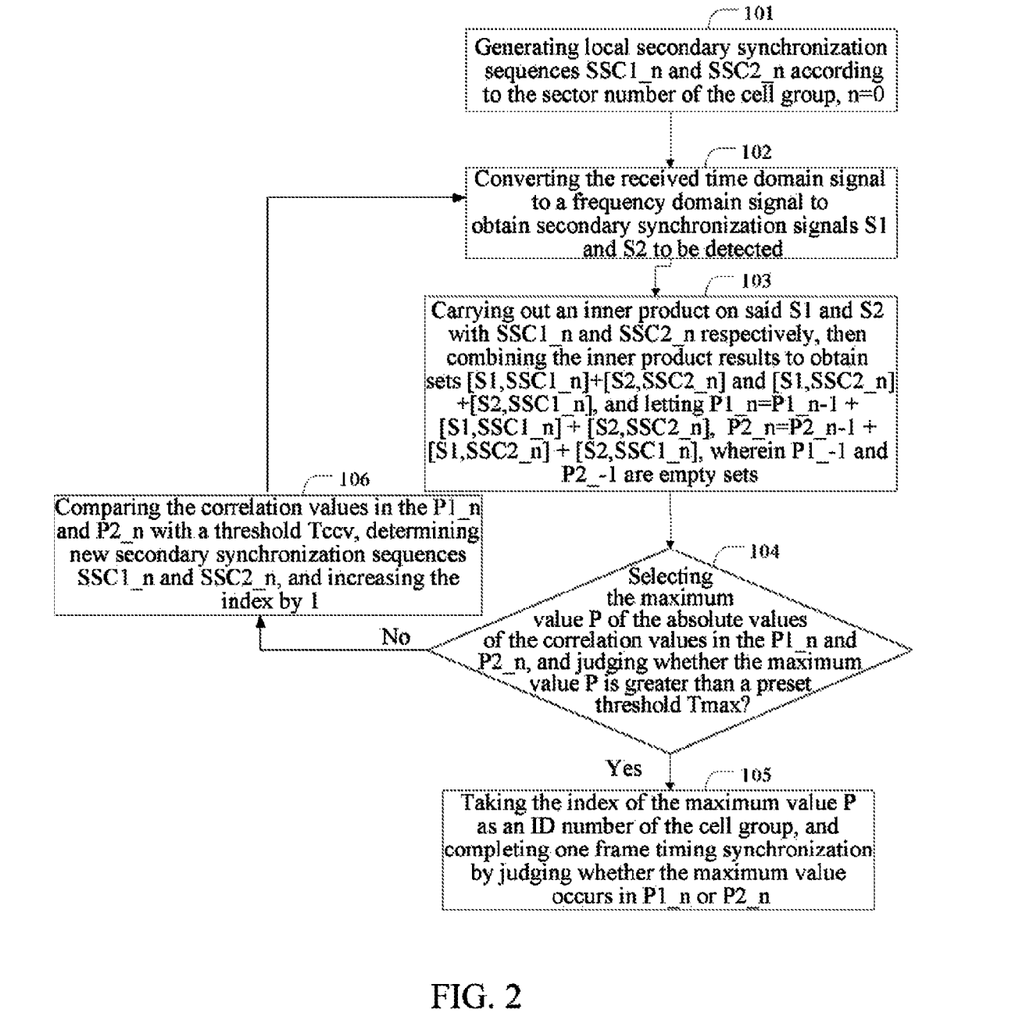
FIG. 2 is the schematic diagram of the flow of the method for joint secondary synchronization signal detection and frame timing synchronization according to the present invention.

With reference to FIG. 2, it is a schematic diagram of the flow of the method for joint secondary synchronization signal detection and frame timing synchronization according to the present invention.

The method for joint secondary synchronization signal detection and frame timing synchronization of the present invention comprises following steps of:

step 101, local secondary synchronization sequences SSC1 and SSC2 are generated according to the sector number of the cell group;

the above step 101 particularly is: detecting the primary synchronization signal P-SCH, carrying out the cross correlation on the received downlink 5 ms half frame time domain signal and the local 3 primary synchronization sequences, and obtaining the inter cell group ID number sector number $N_{ID}^{(2)}$, 5 ms half frame timing synchronization and the frequency offset estimation and compensation by detecting the correlation peak. Then, the local secondary synchronization sequences SSC1 and SSC2 are generated according to the secondary synchronization sequence generation method and the inter cell group ID number sector number $N_{ID}^{(2)}$ detected by the P-SCH, and can be denoted as the 168×62 matrixes respectively. The SSC1 and SSC2 are further divided into SSC1_$n$ and SSC2_$n$ respectively according to 168 rows, wherein n=0, 1, . . . , which denotes the index of multiple frame average. Dividing the local SSC sequence into two parts, SSC1 and SSC2, will effectively reduce the operation complexity when carrying out the cross correlation on the secondary synchronization signal to be detected and the local secondary synchronization sequence.

Step 102, the user terminal converts the received time domain signal to the frequency domain signal to obtain the secondary synchronization signal S1 and S2 to be detected;

the above step 102 particularly is: for a received 10 ms-time domain signal frame, the 5 ms half frame timing synchronization result in the P-SCH detection and blind detection is used to obtain the cyclic prefix (CP) mode to determine the symbol timing of the SSC, and at this time, this time domain signal is demodulated by the OFDM to the frequency domain so as to obtain the secondary synchronization signals S1 and S2 to be detected, and obtain the data of 62 subcarriers on the secondary synchronization channel, wherein the channel frequency response on the secondary synchronization channel takes use of the channel frequency response value of the P-SCH as the estimation value.

Step 103, it is to carry out the inner product on said S1 and S2 with said SSC1_$n$ and SSC2_$n$ respectively, namely carrying out the cross correlation operation, and then the results are combined to obtain the set [S1,SSC1_$n$]+[S2, SSC2_$n$] and [S1,SSC2_$n$]+[S2,SSC1_$n$], letting the P1_$n$=P1_$n$−1+[S1,SSC1_$n$]+[S2,SSC2_$n$], P2_$n$=P2_$n$−1+[S1,SSC2_$n$]+[S2,SSC1_$n$], wherein the P1_−1 and P2_−1 are defined as the empty sets;

in step 103, four correlated vectors [S1,SSC1_0], [S2, SSC2_0], [S1,SSC2_0] and [S2,SSC1_0] are obtained by carrying out the cross correlation on signals S1 and S2 to be detected on the secondary synchronization channel and the local secondary synchronization sequences SSC1_0 and SSC2_0, and at this time, the operation complexity is not increased comparing with the detection of the secondary synchronization signal in the prior art. Four correlated vectors are all 168×1 vector data, and at this time, the operation complexity can be denoted as the 4×168×62 times of multiplying operations, and 4×168×61 times of addition operations. Besides, combining four correlated vectors can obtain the time diversity gain during detecting the cell group ID number. The operation amount of the combination can be denoted as the 2×62 times of addition operations.

Furthermore, the absolute values of the correlation values with the same cell group number in the P1_$n$ and P2_$n$ are compared with the pre-set threshold Tccv, and if the absolute values of the correlation values corresponding to the same cell group number in the P1_$n$ and P2_$n$ are less than the Tccv, then this cell group number is discarded. Generally, the value of said Tccv is normalized to 30.

Step 104, the maximum value P of the absolute values of the correlation values in the P1_$n$ and P2_$n$ is selected, and in order to reduce the error detection probability, the maximum value P can be judged in a certain confidence degree condition, and one preset threshold can be determined according to the probability distribution function of the correlation value and the confidence degree. It is judged whether the maximum value P is greater than the Tmax, and if yes, step 105 is carried out, or else, step 106 is carried out;

after a plurality of times of averages, it can be assumed that the maximum value P is a random variable which complies with the Rayleigh distribution with the average value being 62 and the variance being $62\sigma^2$. Considering $$|H|^2 + \sigma^2 \approx \frac{1}{124}\sum_{k=0}^{61}(S1(k) \times S1^*(k) + S2(k) \times S2^*(k))$$

$$|H|^2 \approx \frac{1}{124}\left(\left|\sum_{k=0}^{61}S1(k) \times SSC1(N_{ID}^1,k)\right|^2 + \left|\sum_{k=0}^{61}S2(k) \times SSC2(N_{ID}^1,k)\right|^2\right)$$

Wherein, in the above formulas, the first formula denotes the energy of the received signal on the secondary synchronization channel, and the second formula denotes the channel average gain on the secondary synchronization channel. The noise power in the channel can be estimated through the above formulas.

When the maximum value P and the preset threshold Tmax are compared, theoretically the probability of the maximum value P>62+$\alpha\sigma$ is an analytic function related to the value of $\alpha$ after carrying out a plurality of times of averages, and the closed expression of the analytic function can be obtained according to the Rayleigh distribution function, and certainly, the threshold value Tmax=62+$\alpha\sigma$ also can be obtained through the emulation when a certain correct probability condition is satisfied. Thus, considering a certain confidence degree, namely a certain correct detection probability, the limitation of the preset threshold Tmax can effectively reduce the operation complexity based on a certain correct detection probability, thereby reducing the cell initial search time.

If the maximum value P is greater than the preset threshold Tmax, then the index corresponding to the maximum value P is taken as the ID number of the cell group, and if this maximum value P occurs in the P1, it denotes that the S1 and S2 are the former half frame and the latter half frame respectively, or else, it denotes that the S1 and S2 are the latter half frame and former half frame respectively, thereby completing the 10 ms-frame timing synchronization.

Step 105, the index of the maximum value P is taken as the ID number of the cell group to complete one frame timing synchronization;

step 106, the absolute values of the correlation values in the P1_$n$ and P2_$n$ are compared with the preset threshold Tccv, the secondary synchronization sequence corresponding to the correlation value of which the absolute value is not less than the Tccv in the P1_$n$ and P2_$n$ is selected as the new secondary synchronization sequences SSC1_$n$ and SSC2_$n$, and the index is increased by 1, and then the step 102 is carried out.

The absolute values of the correlation values with the same cell group number in the P1_$n$ and P2_$n$ are compared with the preset threshold Tccv, and if the absolute values of the correlation values corresponding to the same cell group number in the P1_$n$ and P2_$n$ are less than Tccv, then this cell group number is discarded.

The apparatus for joint secondary synchronization signal detection and frame timing synchronization of the present invention comprises:

a local secondary synchronization sequence generation module, which is configured to: generate local secondary synchronization sequences SSC1_$n$ and SSC2_$n$ according to the sector number of the cell group, and send local secondary synchronization sequences SSC1_$n$ and SSC2_$n$ to the multiple frame average module, wherein n is the index of multiple frame average, n=0;

a multiple frame average module, which is configured to: convert the received time domain signal to the frequency domain signal to obtain the secondary synchronization signal S1 and S2 to be detected; carry out the inner product on said S1 and S2 with SSC1_$n$ and SSC2_$n$ respectively, and then combine the inner product result to obtain sets of [S1,SSC1_$n$]+[S2,SSC2_$n$] and [S1,SSC2_$n$]+[S2,SSC1_$n$], and let the P1_$n$=P1_$n$−1+[S1,SSC1_$n$]+[S2,SSC2_$n$], P2_$n$=P2_$n$−1+[S1,SSC2_$n$]+[S2,SSC1_$n$], and send them to the frame timing synchronization module, wherein the P1_−1 and P2_−1 are empty sets;

a frame timing synchronization module, which is configured to: select the maximum value P of the absolute values of correlation values in the P1_$n$ and P2_$n$, and judge whether the maximum value P is greater than the preset threshold Tmax, and if yes, take the index of the maximum value P as the ID number of the cell group, and judge whether the maximum value occurs in the P1_$n$ or P2_$n$ to complete one frame timing synchronization; and if not, the absolute values of the correlation values in the P1_$n$ and P2_$n$ are compared with the threshold Tccv, select the secondary synchronization sequences corresponding to the correlation values of which the absolute values are not less than the Tccv in the P1_$n$ and P2_$n$ as the new secondary synchronization sequences SSC1_$n$ and SSC2_$n$, and increase the index by 1, and further send them to the multiple frame average module.

Said multiple frame average module is further configured to: compare the absolute values of the correlation values with the same cell group number in the P1_$n$ and P2__2 and the preset threshold Tccv, and if the absolute value of the correlation value corresponding to the same cell group number in the P1_$n$ and P2__2 is less than the Tccv, then discard this cell group number.

Said local secondary synchronization sequence generation module is further configured to: carry out the cross correlation on the received time domain signal and the local primary synchronization sequence, and obtain the sector number of said cell group by detecting the correlation peak.

Said multiple frame average module is configured to: take use of the half frame timing synchronization result and blind detection to obtain the cyclic prefix mode for the received time domain signal frame, and at this time, demodulate said time domain signal by the orthogonal frequency division multiplex (OFDM) to the frequency domain to obtain said secondary synchronization signals S1 and S2 to be detected.

Said local secondary synchronization sequence generation module is further configured to: carry out cross correlation on the received time domain signal and the local primary synchronization sequence, and obtain said half frame timing synchronization result by detecting the correlation peak.

Comparing with the prior art, adopting the method for joint secondary synchronization signal detection and frame timing synchronization of the present invention not only reduces the operation complexity, but also effectively improves the system performance of the secondary synchronization signal detection and frame timing synchronization based on reducing the operation complexity. Besides, it can ensure to further reduce the initial cell search time based on a certain correct detection probability by presetting threshold Tmax. The present invention is suitable for the cell initial search in LTE system of two types of the duplex structure, FDD and TDD.

The above are only preferable implementation examples of the present invention, and are not for limiting the present invention, and the present invention can have various corresponding modifications and transformations for those having ordinary skills. Any modifications substitutions and improvements in the spirit or principle of the present invention shall all fall into the protection scope of the present invention.

INDUSTRIAL APPLICABILITY

Comparing with the prior art, adopting the method for joint secondary synchronization signal detection and frame timing synchronization of the present invention not only reduces the operation complexity, but also effectively improves the system performance of the secondary synchronization signal detection and frame timing synchronization based on reducing the operation complexity. Besides, it can ensure to further reduce the initial cell search time based on a certain correct detection probability by presetting threshold Tmax. The present invention is suitable for the cell initial search in LTE system of two types of the duplex structure, FDD and TDD.

What is claimed is:

1. A method for joint secondary synchronization signal detection and frame timing synchronization, comprising following steps:
   (1) generating two local secondary synchronization sequences, i.e. SSC1_$n$ and SSC2_$n$, according to a sector number of a cell group, wherein n is an index of multiple-frame average, and at this time n=0;
   (2) converting received one frame time domain signal to frequency domain to obtain secondary synchronization signals S1 and S2 to be detected respectively corresponding to two half-frames of the one frame time domain signal;
   (3) carrying out inner products on said S1 and S2 with SSC1_$n$ and SSC2_$n$ respectively to obtain [S1, SSC1_$n$], [S2,SSC2_$n$], [S1,SSC2_$n$], [S2,SSC1_$n$], then combining inner product results to obtain sets [S1,SSC1_$n$]+[S2,SSC2_$n$] and [S1,SSC2_$n$]+[S2,SSC1_$n$], and letting P1_$n$=P1_$n$−1+[S1,SSC1_$n$]+[S2,SSC2_$n$], P2_$n$=P2_$n$−1+[S1,SSC2_$n$]+[S2,SSC1_$n$], wherein P1_−1 and P2_−1 are empty sets;
   (4) selecting a maximum value P of absolute values of correlation values in the P1_$n$ and P2_$n$, and judging whether the maximum value P is greater than a preset threshold Tmax,
   (5) if yes, taking the index of the maximum value P as an ID number of the cell group, and completing one frame timing synchronization by judging whether the maximum value occurs in P1_$n$ or P2_$n$; if not, comparing the absolute values of the correlation values in the P1_$n$ and P2_$n$ with a threshold Tccv, selecting the secondary synchronization sequences corresponding to the correlation value of which the absolute value is not less than the Tccv in the P1_$n$ and P2_$n$ as new secondary synchronization sequences SSC1_$n$ and SSC2_$n$, increasing the index by 1, and then jumping to a step of the multiple-frame average, namely carrying out step (2), and then carrying out step (3).

2. The method as claimed in claim 1, wherein in said step (3), further comprises:
   comparing the absolute values of the correlation values with a same cell group number in the P1_$n$ and P2_$n$ with the preset threshold Tccv, and if the absolute value of the correlation value corresponding to the same cell group number in the P1_$n$ and P2_$n$ is less than the Tccv, then discarding this cell group number.

3. The method as claimed in claim 2, wherein a value of said Tccv is normalized to 30.

4. The method as claimed in claim 1, wherein before said step (1), said method further comprises:
   carrying out cross correlation on the received time domain signals and a local primary synchronization sequence, and obtaining the sector number of the cell group by detecting a correlation peak.

5. The method as claimed in claim 1, wherein said step (2) comprises:
   for the received time domain signals of one frame, taking use of a half frame timing synchronization result and blind detection to obtain a cyclic prefix mode, and at this time, demodulating said time domain signals by orthogonal frequency division multiplex (OFDM) to frequency domain to obtain said secondary synchronization signals S1 and S2 to be detected.

6. The method as claimed in claim 5, wherein before said step (1), said method further comprises:
   carrying out cross correlation on the received time domain signals and a local primary synchronization sequence, and obtaining said half frame timing synchronization result by detecting the correlation peak.

7. An apparatus for joint secondary synchronization signal detection and frame timing synchronization, comprising:
  a local secondary synchronization sequence generation module, which is configured to: generate two local secondary synchronization sequences, i.e. SSC1_$n$ and SSC2_$n$, according to a sector number of a cell group, and send the local secondary synchronization sequences SSC1_$n$ and SSC2_$n$ to a multiple-frame average module, wherein n is an index of multiple-frame average, and n=0;
  the multiple-frame average module, which is configured to: convert received one frame time domain signal to frequency domain to obtain secondary synchronization signals S1 and S2 to be detected respectively corresponding to two half-frames of the one frame time domain signal; carry out inner products on said S1 and S2 with SSC1_$n$ and SSC2_$n$ respectively to obtain [S1,SSC1_$n$], [S2,SSC2_$n$], [S1,SSC2_$n$], [S2,SSC1_$n$], then combine inner product results to obtain sets [S1,SSC1_$n$]+[S2,SSC2_$n$] and [S1,SSC2_$n$]+[S2,SSC1_$n$], let P1_$n$=P1_$n$−1+[S1,SSC1_$n$]+[S2,SSC2_$n$], P2_$n$=P2_$n$−1+[S1,SSC2_$n$]+[S2,SSC1_$n$], and send the P1_$n$ and P2_$n$ to a frame timing synchronization module, wherein P1__−1 and P2__−1 are empty sets;
  the frame timing synchronization module, which is configured to: select a maximum value P of absolute values of correlation values in the P1_$n$ and P2_$n$, and judge whether the maximum value P is greater than a preset threshold Tmax, and if yes, take the index of the maximum value P as an ID number of the cell group, and complete one frame timing synchronization by judging whether the maximum value occurs in P1_$n$ or P2_$n$; if not, compare the absolute values of the correlation values in the P1_$n$ and P2_$n$ with a threshold Tccv, select the secondary synchronization sequences corresponding to the correlation value of which the absolute value is not less than the Tccv in the P1_$n$ and P2_$n$ as new secondary synchronization sequences SSC1_$n$ and SSC2_$n$ with the index being increased by 1 to send to the multiple-frame average module.

8. The apparatus as claimed in claim 7, wherein said multiple-frame average module is further configured to:
  compare the absolute values of the correlation values with a same cell group number in the P1_$n$ and P2_$n$ with the preset threshold Tccv, and if the absolute value of the correlation value corresponding to the same cell group number in the P1_$n$ and P2_$n$ is less than the Tccv, then discarding this cell group number.

9. The apparatus as claimed in claim 7, wherein said local secondary synchronization sequence generation module is further configured to: carry out cross correlation on the received time domain signals and a local primary synchronization sequence, and obtain the sector number of the cell group by detecting a correlation peak.

10. The apparatus as claimed in claim 7, wherein said multiple-frame average module is further configured to: for the received time domain signals of one frame, take use of a half frame timing synchronization result and blind detection to obtain a cyclic prefix mode, and at this time, demodulate said time domain signals by orthogonal frequency division multiplex (OFDM) to frequency domain to obtain said secondary synchronization signals S1 and S2 to be detected.

11. The apparatus as claimed in claim 10, wherein said local secondary synchronization sequence generation module is further configured to: carry out cross correlation on the received time domain signals and a local primary synchronization sequence, and obtain said half frame timing synchronization result by detecting the correlation peak.

* * * * *